(12) United States Patent
Belloni et al.

(10) Patent No.: US 12,491,851 B2
(45) Date of Patent: Dec. 9, 2025

(54) INTEGRAL BRAKE-BY-WIRE BRAKING SYSTEM FOR MOTORCYCLES, CONTROL METHOD FOR AN INTEGRAL BRAKING SYSTEM FOR MOTORCYCLES AND A RELATED MOTORCYCLE

(71) Applicant: Brembo S.p.A., Curno (IT)

(72) Inventors: Andrea Belloni, Curno (IT); Davide Paolini, Curno (IT); Samuele Mazzoleni, Curno (IT)

(73) Assignee: Brembo S.p.A., Curno (IT)

( * ) Notice: Subject to any disclaimer, the term of this patent is extended or adjusted under 35 U.S.C. 154(b) by 87 days.

(21) Appl. No.: 18/259,405

(22) PCT Filed: Dec. 23, 2021

(86) PCT No.: PCT/IB2021/062248
§ 371 (c)(1),
(2) Date: Jun. 27, 2023

(87) PCT Pub. No.: WO2022/144719
PCT Pub. Date: Jul. 7, 2022

(65) Prior Publication Data
US 2024/0083400 A1   Mar. 14, 2024

(30) Foreign Application Priority Data
Dec. 28, 2020 (IT) .................. 102020000032510

(51) Int. Cl.
*B60T 8/26* (2006.01)
*B60T 8/17* (2006.01)
*B60T 8/58* (2006.01)

(52) U.S. Cl.
CPC ............ *B60T 8/261* (2013.01); *B60T 8/1706* (2013.01); *B60T 8/58* (2013.01); *B60T 2220/04* (2013.01);
(Continued)

(58) Field of Classification Search
CPC .......... B60T 8/261; B60T 8/1706; B60T 8/58; B60T 2220/04
(Continued)

(56) References Cited

U.S. PATENT DOCUMENTS

2009/0118961 A1   5/2009 Eckert et al.

FOREIGN PATENT DOCUMENTS

| CN | 105246777 B * | 4/2018 | ............... B60T 11/20 |
| DE | 102012214586 A1 * | 5/2013 | ............ B60T 13/166 |

(Continued)

OTHER PUBLICATIONS

WO-2020058819-A1 (Cappelletti et al.) (Mar. 26, 2020) (Machine Translation) (Year: 2020).*
(Continued)

*Primary Examiner* — Phutthiwat Wongwian
(74) *Attorney, Agent, or Firm* — Marshall & Melhorn, LLC

(57) ABSTRACT

A braking system for a motorcycle may have at least (a) a first brake associated with a front wheel of the motorcycle, at least a first electro-hydraulic or electro-mechanical actuator, operatively connected to the first brake, (b) at least a first manual actuation command, associated with and corresponding to the at least one first brake, to send a braking request from a user, (c) at least a second brake associated with a rear wheel of the motorcycle, (d) at least a second electro-hydraulic or electro-mechanical actuator, operatively connected to the second brake, (e) at least a second manual actuation command, associated with and corresponding to the at least one second brake, to send a brake request from a user, and (f) a control unit operatively connected to the first manual actuation command, to the second manual actuation command and to the first and second electro-hydraulic or electro-mechanical actuators.

9 Claims, 1 Drawing Sheet

(52) U.S. Cl.
CPC ....... *B60T 2230/00* (2013.01); *B60T 2250/02* (2013.01); *B60T 2250/04* (2013.01); *B60T 2270/82* (2013.01)

(58) Field of Classification Search
USPC .......................................................... 701/70
See application file for complete search history.

(56) References Cited

FOREIGN PATENT DOCUMENTS

| | | |
|---|---|---|
| EP | 2279920 A2 | 2/2011 |
| EP | 2487080 A1 | 8/2012 |
| EP | 2554444 A2 | 2/2013 |
| EP | 2810836 A1 | 12/2014 |
| WO | WO-2020058819 A1 * 3/2020 | ............ B60T 8/1706 |

OTHER PUBLICATIONS

European Patent Office, International Search Report and Written Opinion in Application No. PCT/IB2021/062248, dated Mar. 11, 2022, 12 pages, Rijswijk, Netherlands.
Italian Patent Office, Search Report in Application No. IT2020000032510, dated Aug. 24, 2021, 2 pages.

* cited by examiner

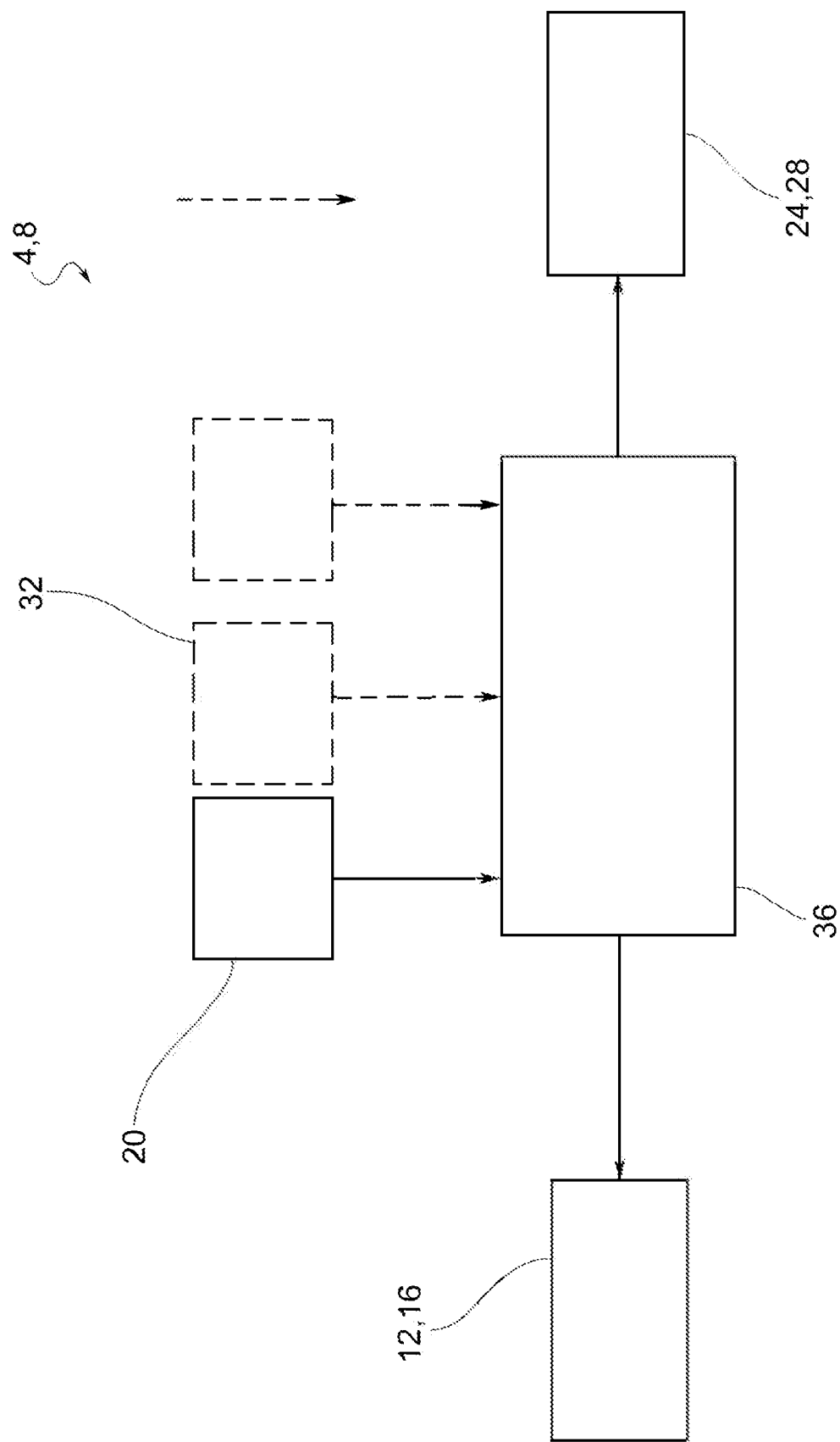

INTEGRAL BRAKE-BY-WIRE BRAKING SYSTEM FOR MOTORCYCLES, CONTROL METHOD FOR AN INTEGRAL BRAKING SYSTEM FOR MOTORCYCLES AND A RELATED MOTORCYCLE

FIELD

The present invention relates to an integral brake-by-wire (BBW) braking system for motorcycles, to a control method for an integral braking system for motorcycles and to a related motorcycle comprising said braking system.

BACKGROUND

Integral braking systems are divided into hydraulic braking systems and electro-hydraulic braking systems.

Among the first, there are hydraulic braking systems with 2 hydraulic lines, in which the actuation applied by the driver on the lever/pedal control is transferred to the front/rear wheel via one of the two hydraulic lines, respectively, and translated into braking force on the single wheel. In this case, the driver must self-modulate the pressure to be imparted to the actuator in order to limit the braking distance, build up braking pressure to the wheels as quickly as possible and avoid locking thereof, to ensure a certain stability to the vehicle. It follows that this configuration is limited in stability and comfort.

To have a better distribution of the braking force between the front and rear wheel, there are integral hydraulic braking systems or CBS (Combined Braking System) which may be single CBS or dual CBS, depending on whether the actuator control acts only on the rear wheel or on both wheels. In these systems, where ABS control is missing, a preset fixed braking force distribution is applied, with obvious limits to safety and driving comfort.

There are also ABS hydraulic braking systems which actively modulate the pressure, reducing it in certain conditions in order to free the wheels and accelerate again in the event of a risk of locking, in order to always maintain a certain stability. According to an embodiment, said stability is a lateral and/or longitudinal stability. ABS systems may also be 2-circuit, single CBS ABS and Dual CBS ABS. In all three cases, the ABS is positioned between the control and the wheel brake and monitoring takes place by virtue of the wheel speed sensors. In the case of single and dual CBS ABS, there are also one (two) additional modulator(s) for connection with the rear (and front) wheel(s). They may also be provided with a boosting function to increase braking comfort.

Currently, electro-hydraulic braking systems are only partial front or rear, depending on the wheel that controls the actuator (front-to-rear or rear-to-front). The electronic braking systems are able to further shorten the braking distance, by virtue of the distribution of electric braking force, with a consequent increase in safety, driving comfort and pitching.

SUMMARY

The need is therefore felt in the art to provide a braking system which allows the technical drawbacks mentioned with reference to the prior art to be solved.

This requirement is met by a braking system according to the claims.

In particular, this need is met by a braking system for a motorcycle comprising:

at least one first brake associated with a front wheel of said motorcycle,
at least one first electro-hydraulic or electro-mechanical actuator, operatively connected to said first brake,
at least one first manual actuation command, associated with and corresponding to said at least one first brake, to send a braking request from a user,
at least a second brake associated with a rear wheel of said motorcycle,
at least a second electro-hydraulic or electro-mechanical actuator operatively connected to said second brake,
at least a second manual actuation command, associated with and corresponding to said at least one second brake, to send a braking request from a user,
a control unit operatively connected to the first manual actuation command, the second manual actuation command and said first and second electro-hydraulic or electro-mechanical actuators,
wherein said control unit is programmed to:
receive a braking request from the user following actuation of at least one of said manual actuation commands,
interpret the braking request as a function of which or how many actuation commands have actually been actuated, and/or the intensity of such actuation given by a stroke and/or actuation force or pressure of the corresponding manual actuation command,
activate at least one of said electro-hydraulic or electro-mechanical actuators, irrespective of the effective actuation of the corresponding manual actuation command, so as to obtain a deceleration of the motorcycle as a function of said braking request.

According to a possible embodiment, said control unit is programmed to perform a distribution of the braking forces between the first and second electro-hydraulic or electro-mechanical actuators as a function of the mass of the motorcycle, the speed of the motorcycle, and/or the front and rear weight distribution of the motorcycle and/or bend angle of the motorcycle.

According to a possible embodiment, the control unit is programmed to perform a distribution of the braking forces between the first and second electro-hydraulic or electro-mechanical actuators even in the case of a single manual actuation command being actuated.

According to a possible embodiment, the control unit is programmed to perform actuation of only the first electro-hydraulic or electro-mechanical actuator in case of actuation of only the second manual actuation command.

According to a possible embodiment, the control unit is programmed to perform actuation of only the second electro-hydraulic or electro-mechanical actuator in case of actuation of only the first manual actuation command.

According to a possible embodiment, said first brake and second brake comprise disc brakes.

According to a possible embodiment, the control unit translates the signal originating from the actuation of each manual actuation command into an overall deceleration request of the motorcycle.

According to a possible embodiment, the control unit translates the signal originating from the actuation of each manual actuation command into a request for braking force to be applied to each or to at least one braking device.

DESCRIPTION OF THE FIGURES

Further features and advantages of the present invention will become more apparent from the following description of preferred and non-limiting embodiments thereof, in which:

FIG. 1 shows a schematic view of a motorcycle comprising a braking system according to an embodiment of the present invention.

DETAILED DESCRIPTION

Elements or parts of elements common to the embodiments described hereinafter will be indicated with the same reference numerals.

With reference to the above figures, reference numeral 4 globally denotes a braking system for a motorcycle 8.

Said braking system 4 for motorcycles 8 comprises at least a first brake 12 associated with a front wheel of said motorcycle 8, at least a first electro-hydraulic or electro-mechanical actuator 16, operatively connected to said first brake 12, at least a first manual actuation command 20, associated with and corresponding to said at least one first brake 12, to send a braking request from a user.

The first brake 12 is for example a disc brake, with a fixed or floating caliper, but it may also be a drum brake.

The first manual actuation command 20 may be, for example, a lever, typically hinged to a motorcycle handlebar, or a pedal, for example hinged to a point of the motorcycle frame close to a corresponding foot support pedal.

The expression "a first manual actuation command 20 associated with and corresponding to said at least one first brake 12" means that the first manual actuation command 20 is provided for the preferential (but not unique) actuation of a specific brake, for example said first brake 12. This means that, for example, the first manual actuation command 20 is a handlebar lever, for example located on the left side, in order to allow the preferential actuation of the first brake 12 operatively connected with the front wheel of the vehicle. In any case, as better described below, the actuation of the first brake 12 following the actuation of the first manual actuation command 20 is not direct and is not even unique or automatic, meaning that following the actuation of the first manual actuation command 20, the braking system may intervene by only partially actuating said first brake 12 or by actuating also a second brake 24, in addition or alternatively to said first brake 12.

The first actuator 16 comprises for example an electric motor and, preferably, transmission means for the direct or indirect connection between the electric motor and braking mechanisms of said first brake 12, such as for example pistons and pads in a known manner. In the case of an electro-hydraulic actuator, the electric motor, directly or indirectly, will pressurize a brake fluid which in turn actuates the braking mechanisms of said first brake 12, such as for example pistons and pads in a known manner.

Said braking system 4 for motorcycles 8 comprises at least a second brake 24 associated with a rear wheel of said motorcycle 8, at least a second electro-hydraulic or electro-mechanical actuator 28, operatively connected to said second brake 20, at least a second manual actuation command 32, associated with and corresponding to said at least one second brake 24, to send a braking request from a user.

The second brake 24 is for example a disc brake, with a fixed or floating caliper, but it may also be a drum brake.

The second manual actuation command 32 may be, for example, a lever, typically hinged to a motorcycle handlebar, or a pedal, for example hinged to a point of the motorcycle frame close to a corresponding foot support pedal.

The expression "a second manual actuation command 32 associated with and corresponding to said at least one second brake 24' means that the second manual actuation command 32 is provided for the preferential (but not unique) actuation of a specific brake, for example said second brake 24. This means that, for example, the second manual actuation command 32 is a pedal provided to allow the preferential actuation of the second brake 24 operatively connected with the rear wheel of the motorcycle. In any case, as better described below, the actuation of the second brake 24 following the actuation of the second manual actuation command 32 is not direct and is not even unique or automatic, meaning that following the actuation of the second manual actuation command 32, the braking system may intervene by only partially actuating said second brake 24 or by actuating also the first brake 12, in addition or alternatively to said second brake 24.

The second actuator 28 comprises for example an electric motor and, preferably, transmission means for the direct or indirect connection between the electric motor and braking mechanisms of said second brake 24, such as for example pistons and pads in a known manner. In the case of an electro-hydraulic actuator, the electric motor, directly or indirectly, will pressurize a brake fluid which in turn actuates the braking mechanisms of said second brake 24, such as for example pistons and pads in a known manner.

The braking system 4 further comprises a control unit 36 operatively connected to the first manual actuation command 20, the second manual actuation command 32 and said first and second electro-hydraulic or electro-mechanical actuators 16, 28.

In particular, the control unit 36 is programmed to:
receive a braking request from the user following actuation of at least one of said manual actuation commands 20, 32,
interpret the braking request as a function of which or how many actuation commands have actually been actuated, and/or the intensity of such actuation given by a stroke and/or actuation force or pressure of the corresponding manual actuation command 20, 32,
activate at least one of said electro-hydraulic or electro-mechanical actuators 16, 28, irrespective of the effective actuation of the corresponding manual actuation command 20, 32, so as to obtain a deceleration of the motorcycle 8 as a function of said braking request.

According to a possible embodiment, said control unit 36 is programmed to perform a distribution of the braking forces between the first and the second electro-hydraulic or electro-mechanical actuator 16, 28 as a function of the mass of the motorcycle 8, the speed of the motorcycle 8, and/or a bend angle of the motorcycle 8.

According to a possible embodiment, the control unit 36 is programmed to perform a distribution of the braking forces between the first and second electro-hydraulic or electro-mechanical actuator 16, 28 even in the case of a single manual actuation command 20, 32 being actuated.

According to a possible embodiment, the control unit 36 is programmed to perform actuation of only the first electro-hydraulic or electro-mechanical actuator 16 in case of actuation of only the second manual actuation command 32.

According to a possible embodiment, the control unit 36 is programmed to perform actuation of only the second electro-hydraulic or electro-mechanical actuator 28 in case of actuation of only the first manual actuation command 20.

In general, the control unit 36 may translate the signal originating from the actuation of each manual actuation command 20, 32 into an overall deceleration request of the motorcycle 8 which is implemented by suitably actuating the respective first and second actuators 16, 28 irrespective of the real distribution imposed by the manual actuation carried out by the user.

It is also possible to provide for the control unit 36 to translate the signal originating from the actuation of each manual actuation command 20, 32 into a request for braking force to be applied to each or to at least one braking device 12, 24.

The operation of a braking system according to the present invention shall now be described.

The described braking system is implemented by creating a decoupling between the driver's braking request on the commands (lever or brake) and the actuation of the braking force of the vehicle.

In this way, the driver's braking request exerted on a manual actuation command 20, 32, which may be for example the brake lever or the pedal, is acquired by an electronic system, i.e. by the control unit 36.

Such control unit 36 processes the braking request or requests from the commands and then drives the actuation devices 16, 28 to generate a front and rear braking force.

Such braking force may be generated, as seen, by electro-hydraulic or electromechanical actuators.

The control unit 36 will request and actuate braking forces so that the preferred distribution of braking between the front and rear brakes is exploited.

Compared to the systems described in the prior art, this system, by virtue of the complete decoupling between the driver's request and the actuation of the braking force, allows:

having, if required, the control of both the front and rear axle brakes with a single command, to improve comfort and simplify driving the vehicle for the driver having an optimal distribution adaptable to various operating conditions (for example the vehicle weight and the bend angle of the vehicle).

allowing, if required, the use of different commands to actuate the full braking of the vehicle without having interactions between commands and without having a degradation of the feeling on the command.

As may be appreciated from what is described, the present invention overcomes the drawbacks of the prior art.

In particular, the present invention provides an integral electro-hydraulic or electromechanical braking system for motorcycles in which, by virtue of the decoupling between the driver's actuation on the commands and the generation of braking force, the combined braking functionality (Combined Brake System) is enabled on both axles, maximizing the vehicle deceleration and ensuring high levels of comfort for the driver.

Furthermore, according to the driving conditions, the grip conditions and the level of inclination of the road surface, the electronically controlled braking system will calculate the best braking force distribution curve between the front and rear axles to ensure braking that takes comfort into account (possibility of braking with little force on the commands or even with a single command) and at the same time maximizing braking performance by making the most of the grip of both wheels.

Therefore, it is possible to have an efficient control of the braking stability of the motorcycle, according to the dynamic parameters of the vehicle itself, irrespective of the manual actuation command actually used by the user.

In addition, the entire braking system of the motorcycle may be controlled using a single command (lever, pedal or other input).

A person skilled in the art may make several changes and variants to the lighting and/or signaling devices and to the assembly methods of said devices described above in order to meet specific and incidental needs, all falling within the scope of protection defined in the following claims.

The invention claimed is:

1. A braking system for a motorcycle comprising:
   at least one first brake associated with a front wheel of said motorcycle,
   at least one first electro-hydraulic or electro-mechanical actuator, operatively connected to said first brake,
   at least one first manual actuation command, associated with and corresponding to said at least one first brake, to send a braking request from a user,
   at least a second brake associated with a rear wheel of said motorcycle,
   at least a second electro-hydraulic or electro-mechanical actuator operatively connected to said second brake,
   at least a second manual actuation command, associated with and corresponding to said at least one second brake, to send a braking request from a user,
   a control unit operatively connected to the first manual actuation command, the second manual actuation command and said first and second electro-hydraulic or electro-mechanical actuators,
   wherein said control unit is programmed to:
   receive a braking request from the user following actuation of at least one of said manual actuation commands,
   interpreting the braking request as a function of which or how many actuation commands have actually been actuated, and/or the intensity of such actuation given by a stroke and/or actuation force or pressure of the corresponding manual actuation command,
   activating at least one of said electro-hydraulic or electromechanical actuators, irrespective of the effective actuation of the corresponding manual actuation command, so as to obtain a deceleration of the motorcycle as a function of said braking request, wherein said control unit is further programmed to perform a distribution of the braking forces between the first and second electro-hydraulic or electro-mechanical actuators as a function of the mass of the motorcycle, the speed of the motorcycle, and/or the front and rear weight distribution of the motorcycle and/or bend angle of the motorcycle.

2. The braking system for a motorcycle according to claim 1, wherein the control unit is programmed to perform a distribution of the braking forces between the first and second electro-hydraulic or electro-mechanical actuators even in the case of a single manual actuation command being actuated.

3. The braking system for a motorcycle according to claim 1, wherein the control unit is programmed to perform actuation of only the first electro-hydraulic or electro-mechanical actuator in the case of actuation of only the second manual actuation command.

4. The braking system for a motorcycle according to claim 1, wherein the control unit is programmed to perform actuation of only the second electro-hydraulic or electro-mechanical actuator in case of actuation of only the first manual actuation command.

5. The braking system for a motorcycle according to claim 1, wherein said first brake and second brake comprise disc brakes.

6. The braking system for a motorcycle according to claim 1, wherein the control unit translates the signal originating from the actuation of each manual actuation command into an overall deceleration request of the motorcycle.

7. The braking system for a motorcycle according to claim 1, wherein the control unit translates the signal originating from the actuation of each manual actuation command into a request for braking force to be applied to each or to at least one brake.

8. A motorcycle comprising a system according to claim 1.

9. A braking system for a motorcycle comprising:
at least one first brake associated with a front wheel of said motorcycle,
at least one first electro-hydraulic or electro-mechanical actuator, operatively connected to said first brake,
at least one first manual actuation command, associated with and corresponding to said at least one first brake, to send a braking request from a user,
at least a second brake associated with a rear wheel of said motorcycle,
at least a second electro-hydraulic or electro-mechanical actuator operatively connected to said second brake,
at least a second manual actuation command, associated with and corresponding to said at least one second brake, to send a braking request from a user,
a control unit operatively connected to the first manual actuation command, the second manual actuation command and said first and second electro-hydraulic or electro-mechanical actuators,
wherein said control unit is programmed to:
receive a braking request from the user following actuation of at least one of said manual actuation commands,
interpreting the braking request as a function of which or how many actuation commands have actually been actuated, and/or the intensity of such actuation given by a stroke and/or actuation force or pressure of the corresponding manual actuation command,
activating at least one of said electro-hydraulic or electromechanical actuators, irrespective of the effective actuation of the corresponding manual actuation command, so as to obtain a deceleration of the motorcycle as a function of said braking request, wherein the control unit is programmed to perform a distribution of the braking forces between the first and second electro-hydraulic or electro-mechanical actuators even in the case of a single manual actuation command being actuated.

* * * * *